US007477572B2

(12) United States Patent
Caronti et al.

(10) Patent No.: US 7,477,572 B2
(45) Date of Patent: Jan. 13, 2009

(54) MICROFABRICATED CAPACITIVE ULTRASONIC TRANSDUCER FOR HIGH FREQUENCY APPLICATIONS

(75) Inventors: Alessandro Caronti, Roma (IT); Giosuè Caliano, Roma (IT); Alessandro Stuart Savoia, Roma (IT); Philipp Gatta, Roma (IT); Massimo Pappalardo, Roma (IT)

(73) Assignee: Esaote, S.p.A., Milan (IT)

( * ) Notice: Subject to any disclaimer, the term of this patent is extended or adjusted under 35 U.S.C. 154(b) by 142 days.

(21) Appl. No.: 11/520,145

(22) Filed: Sep. 13, 2006

(65) Prior Publication Data

US 2007/0059858 A1 Mar. 15, 2007

(30) Foreign Application Priority Data

Sep. 14, 2005 (EP) ................................. 05425642

(51) Int. Cl.
*H04L 21/00* (2006.01)
*B06B 1/02* (2006.01)

(52) U.S. Cl. ...................................................... 367/140

(58) Field of Classification Search ................. 367/153, 367/163, 174, 176, 178, 181; 381/113, 116, 381/174, 191, 423, 424, 425; 438/50, 53
See application file for complete search history.

(56) References Cited

U.S. PATENT DOCUMENTS 5,619,476 A * 4/1997 Haller et al. ................ 367/181
5,870,351 A 2/1999 Ladabaum
6,262,946 B1 7/2001 Khuri-Yakub et al.
6,381,197 B1 * 4/2002 Savord et al. ............... 367/178
6,829,131 B1 * 12/2004 Loeb et al. .................. 361/234
7,023,065 B2 * 4/2006 Ayazi et al. ................. 257/414
7,274,623 B2 * 9/2007 Bayram et al. .............. 367/140
2006/0007045 A1 * 1/2006 Fiasca et al. .......... 343/700 MS
2007/0059858 A1 * 3/2007 Caronti et al. ................ 438/50
2008/0184549 A1 * 8/2008 Nguyen-Dinh et al. ........ 29/594
2008/0212407 A1 * 9/2008 Caliano et al. .............. 367/140

FOREIGN PATENT DOCUMENTS

EP 1 493 499 A2 1/2005
EP 1764162 A1 * 3/2007
WO WO 02/090242 A2 11/2002

OTHER PUBLICATIONS

X. Jin, I. Ladabaum, F. L. Degertekin, S. Calmes, e B. T. Khuri-Yakub in "*Fabrication and Characterization of Surface Micromachined Capacitive Ultrasonic Immersion Transducers*", J. Microelectromech. Syst., vol. 8(1), pp. 100-114, (Sep. 1998).

(Continued)

*Primary Examiner*—Dan Pihulic
(74) *Attorney, Agent, or Firm*—Woodard, Emhardt, Moriarty, McNett & Henry LLP

(57) ABSTRACT

The invention relates to an electro-acoustic transducer, particularly an ultrasonic transducer, comprising a plurality of electrostatic micro-cells of the cMUT type. The electrostatic micro-cells are arranged in homogeneous groups of micro-cells having the same geometrical characteristics. The micro-cells of each group have geometries different from the geometry of the micro-cells of the other group or groups.

31 Claims, 8 Drawing Sheets

OTHER PUBLICATIONS

X. Jin, I. Ladabaum, and B. T. Khuri-Yakub in "*The Microfabrication of Capacitive Ultrasonic Transducers*", Journal of Microelectromechanical Systems, vol. 7, No. 3, pp. 295-302, (Sep. 1998).

I. Ladabaum, X. Jin, H. T. Soh, A. Atalar and B. T. Khuri-Yakub in "*Surface Micromachined Capacitive Ultrasonic Transducers*", IEEE Trans. Ultrason. Ferroelect. Freq. Contr., vol. 45, pp. 678-690, (May 1998).

R. A. Noble, R. J. Bozeat, T. J. Robertson, D. R. Billson and D. A. Hutchins, "*Novel Silicon Nitride Micromachined Wide Bandwidth Ultrasonic Transducers*", IEEE Ultrasonics Symposium isbn:0-7803-4095-7, (1998).

W. P. Mason, "Electromechanical Transducers and Wave Filters," D. Van Nostrand Company, 2nd Ed., pp. 148-149, (1943).

A. Caronti, R. Carotenuto, G. Caliano, and M. Pappalardo, "*The effects of membrane metallization in capacitive microfabricated ultrasonic transducers*," J. Acoust. Soc. Am., vol. 115, No. 2, pp. 651-657, (2004).

* cited by examiner

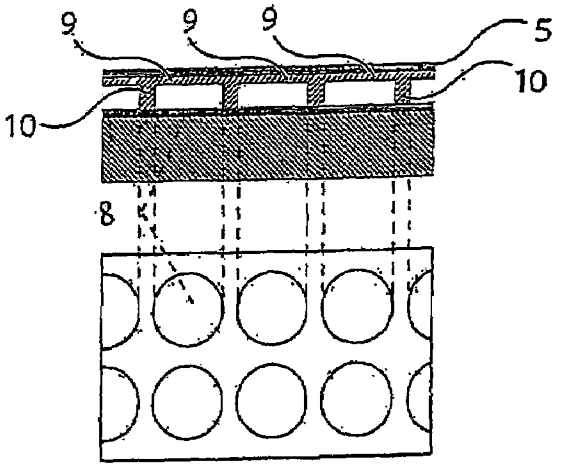
Fig. 4a
Fig. 4b
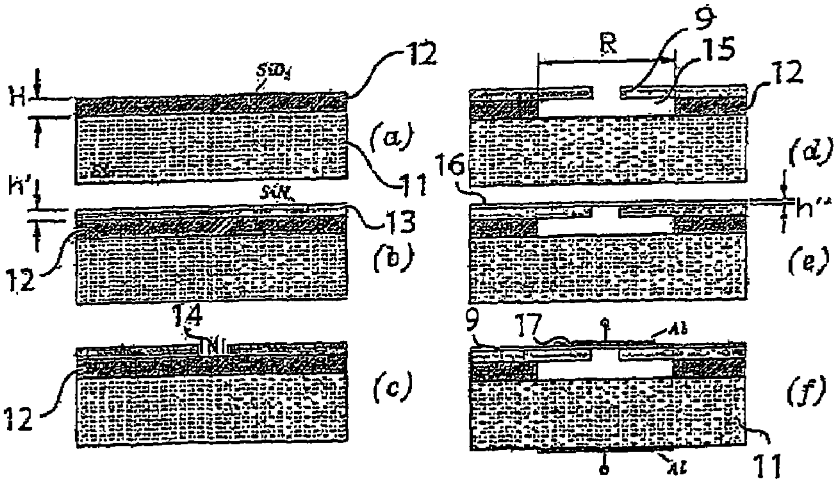
Fig. 5

MICROFABRICATED CAPACITIVE ULTRASONIC TRANSDUCER FOR HIGH FREQUENCY APPLICATIONS

CROSS-REFERENCES TO RELATED APPLICATIONS

This application claims priority to European Patent Application No. EP 05425642.5, filed Sep. 14, 2005, entitled "MICROFABRICATED CAPACITIVE ULTRASONIC TRANSDUCER FOR HIGH FREQUENCY APPLICATIONS", which is expressly incorporated by reference herein, in its entirety.

BACKGROUND OF THE INVENTION

The present invention relates to an electro-acoustic, particularly ultrasonic, transducer of the microfabricated capacitive type also known as cMUT (Capacitive Micromachined Ultrasonic Transducer).

In the second half of the last century a great number of echographic systems have been developed, capable to obtain information from surrounding means, particularly from human body, which are based on the use of elastic waves at ultrasonic frequency.

At the present stage, the performance limit of these systems derives from the devices capable to generate and detect ultrasonic waves. In fact, thanks to the great development of microelectronics and digital signal processing, both the band and the sensitivity, and the cost of these systems as well are substantially determined by these specialised devices, generally called ultrasonic transducers (UTs). The majority of UTs are realised by using piezoelectric ceramic. When the ultrasounds are used for obtaining information from solid materials, it is sufficient the employment of the sole piezoceramic, since the acoustic impedance of the same is of the same magnitude order of that of solids; on the other hand, in most applications generation and reception of the ultrasonic waves occur in fluids, and hence piezoceramic is insufficient because of the great impedance mismatching existing between the same and fluids and, for example, tissues of the human body.

In order to improve the performances of UTs, two techniques have been developed: matching layers of suitable acoustic impedance, and composite ceramic. With the first technique, the low acoustic impedance is coupled to the much higher one of the ceramic through one or more layers of suitable material a quarter of the wavelength thick; with the second technique, it is made an attempt to lower the acoustic impedance of piezoceramic by forming a composite made of this active material and an inert material having lower acoustic impedance (typically epoxy resin). These two techniques are nowadays simultaneously used, considerably increasing the complexity of implementation of these devices and consequently increasing costs and decreasing reliability. Also, the present multi-element piezoelectric transducers have strong limitations as to geometry, since the size of the single elements must be of the order of the wavelength (fractions of millimeter), and to electric wiring, since the number of elements is very large (up to some thousands in case of array multi-element transducers).

The electrostatic effect is a valid alternative to the piezoelectric effect for carrying out ultrasonic transducers. Electrostatic ultrasonic transducers, made of a thin metallized membranes (mylar) typically stretched over a metallic plate, known as "backplate", have been used since 1950 for emitting ultrasounds in air, while the first attempts of emission in water with devices of this kind were on 1972. These devices are based on the electrostatic attraction exerted on the membrane which is forced to flexurally vibrate when an alternate voltage is applied between it and the backplate; during reception, when the membrane is set in vibration by an acoustic wave, incident on it, the capacity modulation due to the membrane movement is used to detect the wave.

More specifically, with reference to FIG. 1, the electrostatic transducer 1, the most known application of which is the condenser microphone, is made of a membrane 2 stretched by a tensile radial force τ in front of a backplate 3, through a suitable support 4 which assures a separation distance $d_g$ between membrane 2 and backplate 3.

If the membrane 2 is provided with a metallization 5 and the backplate 3 is conductive, this structure operates as a capacitor of capacitance $$C = \varepsilon \cdot \frac{A}{d_g} \tag{1}$$

having a fixed electrode (the backplate 3) and a movable one (the membrane 2) both of area A, being ∈ the dielectric constant of air. By applying a continuous voltage $V_{DC}$ between the two electrode, through a resistor R, an electric charge $Q=V_{DC}C$ distributes along them. An incident acoustic wave puts in flexural vibration the membrane 2 and the related deformation makes the distance $d_g$ between the fixed electrode and the movable one vary, and thus consequently the capacitance C of the structure. The variation of capacitance, for the same charge Q, is balanced by an opposite variation of voltage and thus, as a result, at the ends of terminal M3, separated from the movable electrode through the blocking capacitor $C_b$, there appears an alternate voltage V of frequency equal to the one of the incident acoustic wave and of amplitude proportional, through surface A of the membrane 2, to the amplitude of the incident pressure. Such alternate voltage V may be detected on the resistor $R_{in}$ when terminal M3 is connected to terminal M2 through switch 6.

In order to generate acoustic waves in a fluid, an alternate voltage $V_{AC}$ is superimposed to the continuous voltage $V_{DC}$, by connecting terminal M3 to terminal M1 (as shown in FIG. 1). Because of the electrostatic attraction force $$F = \varepsilon \frac{A \cdot (V_{DC} + V_{AC})^2}{2d_g} \tag{2}$$

the membrane 2 is forced to flexurally oscillate with a vibration amplitude proportional to the applied alternate voltage $V_{AC}$. The correct equations putting the electric parameters, voltage and current, in relation with the mechanical ones, vibration velocity and force exerted by the membrane on the fluid, are well known and obtainable in literature.

The electrostatic transducer 1 follows the classic law of the invariability of the band-gain product. In fact, the band is limited by the first resonance frequency of the flexural vibration of the membrane 2, that, in the case when the membrane 2 is circular, is expressed by the relation:

$$f_0 = \frac{0.47 d_m}{R_m^2}\sqrt{\frac{E_Y}{\rho(1-\nu^2)}} \quad (3)$$

where $d_m$ is the thickness of the plate, $R_m$ is the radius, $E_Y$ the Young's modulus of the structural material, ν the Poisson's ratio and ρ the mass density per unity volume. It may be noted, from this expression, that in order to increase the resonance frequency, it is necessary to decrease the radius of the membrane. However both the radiated power and the reception sensitivity depend on the area A of the membrane 2, whereby decreasing the membrane radius the resonance frequency increases, but its performances are also considerably reduced. Typically, the resonance frequency of these devices for emission in air is of the order of hundred of kHz, when the surface of the backplate 3 is obtained through turning or milling machining.

In order to increase the frequency, and at the same time have reasonably high sensitivities for practical applications, it is adopted the solution, shown in FIG. 2, of stretching the membrane 2 directly on the backplate 3'. Because of the surface microporosity of the backplate 3', the membrane 2 is effectively in contact with this only in some regions having extremely limited extension; in such a way, micro-cavities having small lateral size are defined.

In this way, the membrane 2 having radius a is subdivided into many micro-membranes of lateral size L<<a and the mean resonance frequency of the membrane increases from audio frequencies of the condenser microphone up to some hundreds of kHz, depending on the mean lateral size of the micro-cavities and on the applied tensile tension.

With reference to FIGS. 3*a* and 3*b*, in order to further increase the resonance frequency and to control its value, it has been employed a silicon backplate 3", suitably doped to make it conductive, the surface of which is micromachined. In fact, through the so-called "bulk micromachining" technique, it is possible to fabricate a backplate 3" with a controlled roughness made of a thin grid of pyramidal shaped engravings of step p.

The membrane 2 is in contact with the backplate 3" only on the vertexes of the micro-pyramids 7, thus creating well defined and regular micro-cavities 8 of very small size. The obtained frequency increase is essentially due to the reduced lateral size of the micro-cavities (about 50 micrometers).

With transducers of this type, known as "bulk micromachined ultrasonic transducers", maximum frequencies of about 1 MHz for emission in water and bandwidths of about 80% are reached; the device characteristics are strongly dependent on the tension applied to the membrane 2 which may not be easily controlled. These transducers also suffer from another drawback. The membrane 2 is stretched on the backplate 3" and at the same time it is pressed onto the vertexes of the micro-pyramids 7 by the electrostatic attraction force generated by the bias voltage $V_{DC}$; when the excitation frequency increases, the vertexes of the micro-pyramids 7 tend not to operate as constraints, but rather a disjunction between the membrane 2 and these ones occurs. In fact, when the excitation frequency increases, the membrane 2 tends to vibrate according to higher order modes, i.e. according to modes presenting in-phase zones and in-counterphase zones with spontaneous creation of nodal lines with a step shorter than the one of the vertexes of the micro-pyramids 7. When such a phenomenon begins to occur, the membranes 2 of the micro-cavities 8 do not vibrate any more all in phase, but there is a trend in the creation of zones vibrating in counterphase, whereby the emitted radiation rapidly tends to decrease.

In order to overcome this limitation, it has been recently introduced a new generation of micromachined silicon capacitive ultrasonic transducers known as "surface micromachined ultrasonic transducers" or also as capacitive Micromachined Ultrasonic Transducers (cMUTs). The cMUTs, and their related processes of fabrication with the silicon micro-machining technology, have been disclosed, for example, by X. Jin, I. Ladabaum, F. L. Degertekin, S. Calmes, e B. T. Khuri-Yakub in "*Fabrication and characterization of surface micromachined capacitive ultrasonic immersion transducers*", J. Microelectromech. Syst., vol. 8(1), pp. 100-114, September 1998, by X. Jin, I. Ladabaum, e B. T. Khuri-Yakub in "*The microfabrication of capacitive ultrasonic Transducers*", Journal of Microelectromechanical Systems, vol 7 No 3, pp. 295-302, September 1998, by I. Ladabaum, X. Jin, H. T. Soh, A. Atalar and B. T. Khuri-Yakub in "*Surface micromachined capacitive ultrasonic transducers*", IEEE Trans. Ultrason. Ferroelect. Freq. Contr., vol. 45, pp. 678-690, May 1998, in the U.S. Pat. No. 5,870,351 by I. Ladabaum et al., in the U.S. Pat. No. 5,894,452 by I. Ladabaum et al., and by R. A. Noble, R. J. Bozeat, T. J. Robertson, D. R. Billson and D. A. Hutchins in "*Novel silicon nitride micromachined wide bandwidth ultrasonic transducers*", IEEE Ultrasonics Symposium isbn: 0-7803-4095-7, 1998.

These transducers are made of a bidimensional array of electrostatic micro-cells, electrically connected in parallel so as to be driven in phase, obtained through surface micromachining. In order to obtain transducers capable to operate in the range 1-15 MHz, typical in many echographic applications for non-destructive tests and medical diagnostics, the micro-membrane lateral size of each cell is of the order of ten microns; moreover, in order to have a sufficient sensitivity, the number of cells necessary to make a typical element of a multi-element transducer is of the order of some thousands.

With reference to FIGS. 4*a* and 4*b*, the cMUTs are made of an array of closed electrostatic micro-cells, the membranes 9 of which are constrained at the supporting edges of the same cell, also called as "rails" 10. The cell may assume circular, hexagonal, or also squared shape. In this type of transducer it is more appropriate to speak of thin plate or, better, micro-plate instead of membrane: in such case its flexural stiffness is mainly due to its thickness.

With respect to the transducer of FIGS. 3*a* and 3*b*, the fundamental difference is that each micro-cell is provided with its micro-plate 9 constrained at the edge 10 of the same micro-cell and hence mechanically uncoupled from the others. In the previous case the membrane is unique and the constraints (the vertexes of the micro-pyramids) only prevent the membrane moving in direction perpendicular to it and only in one sense; on the other hand, they do not prevent rotation. The micro-membranes of FIG. 3*a*, defined by the vertexes of the micro-pyramids 7, are elastically coupled since the constraint allow a micro-membrane to transmit to another one torsional stresses which causes the establishing of higher order modes which are responsible for frequency limitation.

On the contrary, cMUT transducers allow very high frequencies to be reached, since the micro-plates 9 are uncoupled and frequency limitation is caused by higher order modes of each micro-plate 9 occurring at much higher frequencies.

The fundamental steps of a conventional process for fabricating cMUT transducer micro-cells through silicon micromachining technology are described in U.S. Pat. No. 5,894,452, and they are shown in FIG. 5.

As shown in FIG. 5*a*, a sacrificial film 12 (for example silicon dioxide), the thickness H of which will define the distance $d_g$ between micro-plate 9 and the backplate, is deposited on a silicon substrate 11.

FIG. 5*b* shows that a second structural film 13, for example of silicon nitride, of thickness h', is deposited on the first sacrificial film 12; a narrow hole 14 (etching via) is formed in it, through classical photolithographic techniques, in order to create a path, shown in FIG. 5*c*, for removing the underlying sacrificial film 12.

A selective liquid solution is used for etching only the sacrificial film 12, whereby, as shown in FIG. 5*d*, a large cavity 15, circular in shape and having radius dependent on the etching time, is created under the structural film 13 which remains suspended over the cavity 15 and which is the micro-plate 9 of the underlying micro-cell.

Finally, the etching hole 14 is sealed by depositing a second silicon nitride film 16, as shown in FIG. 5*e*. With reference to FIG. 5*f*, the cells are completed by evaporating a metallic film 17 on the micro-plate 9 which is one of the electrodes, while the second one is made of the silicon substrate 11 heavily doped and hence conductive.

Although the cMUT fabrication technologies are in continuous development allowing to make even smaller and more reliable transducers, however, some limitations exist, precluding their spread use especially for applications at frequencies above 15 MHz. In fact, many applications, both in the field of medical ultrasound diagnostics in areas such as dermatology, ophthalmology, cardiovascular research and biological research on small animals, and in the field of industrial applications for non-destructive testing and of acoustic microscopy, require very high resolutions, which can only be obtained using high frequency ultrasonic transducers, i.e. of the order of tens MHz. As an example, the typical operating frequencies in intravascular ultrasound applications are in between 20 MHz and 50 MHz, so that resolutions of less than 100 μm can be achieved.

Also for these high frequency applications, the cMUT technology could be particularly advantageous especially if it is considered that, at present, most of the transducers used for these applications are single element, mechanically scanned piezoelectric transducers with fixed focus. There is a growing interest, in fact, towards electronically scanned arrays (phased array), which do not need any mechanical movement of the transducer and have higher versatility and miniaturization. The use of the cMUT technology could allow to manufacture extremely compact and flexible arrays also thanks to the possibility of integrating on the same chip part of the driving/interfacing electronics of the same transducers.

However, the fabrication of single element cMUTs and/or arrays for high frequency applications (i.e., above 15 MHz up to 50 MHz and beyond), with high fractional bandwidths (higher than 80%), presents great difficulties if compared to transducers for low-medium frequency applications (i.e. up to 15 MHz) because of physical and technological limitations due to the required operating frequency as it will be described later on.

One of the most interesting features of cMUT transducers is the wide bandwidth that can be achieved and which strictly determines the axial resolution of the associated echographic system, that is, the ability to resolve details in depth. This characteristic originates from both the low mechanical impedance of the cMUT membranes, as shown in FIG. 6, where it is illustrated a comparison between the specific acoustic impedance of water (dashed line) and that of a cMUT membrane resonating at 12 MHz (solid line), and the high acoustic coupling between the transducer and the fluid.

The influence of the mechanical impedance on the transmit pressure bandwidth is shown in FIG. 7 for the case of a rigid piston transducer, provided with a spring, and actuated by a constant harmonic driving force: the mechanical impedance of the system is increased by varying the piston thickness from 1 μm up to 100 μm; the elastic constant of the spring is consequently increased in such a way to keep the resonance frequency equal to 10 MHz. As can be seen, the average transmit pressure, simulated by finite element analysis (FEM), has a bandwidth strongly affected by the transducer's mechanical impedance.

In a cMUT transducer, the acoustic coupling with the fluid makes it possible to generate of wideband pressure pulses through the use of a high number of acoustic sources, whose dimensions are much less than the wavelength (micro-membranes), and which are spaced by less than the same wavelength. If it is true that the single micro-membrane cannot generate wideband pulses, being the radiation impedance in the fluid essentially imaginary (W. P. Mason, "Electromechanical Transducers and Wave Filters," D. Van Nostrand Company, $2^{nd}$ Ed., 1943), the overall behaviour of many micro-membranes, electrically connected in parallel and opportunely dimensioned, approximates that of a continuous source of equivalent dimensions greater than the wavelength, for which the radiation impedance in the fluid is essentially real.

A typical configuration of a cMUT element with circular membranes is the "matrix" arrangement depicted in FIG. 8, where $D_m$ is the membrane diameter and $p_m > D_m$ is the center-to-center distance (pitch). For a given diameter $D_m$, the higher the pitch $p_m$, the lower the element filling factor, the acoustic coupling, and the transmit bandwidth. This behaviour is confirmed by the finite element modeling (FEM) shown in FIG. 9; the upper cut-off of the transmitted bandwidth is determined by the anti-resonance frequency of the membranes, that is about 22.5 MHz in the specific example of FIG. 9.

Therefore, the basic requirements to achieve a wide bandwidth in a cMUT transducer are essentially two: on one side, a low mechanical impedance of the membranes to achieve a fluid controlled transmission, on the other side, a sufficiently high number of membranes connected in parallel and a pitch enough small in comparison with the wavelength so as to have an adequate acoustic coupling. If these requirements are relatively easy to be met for applications at low and medium frequency (up to 15 MHz), however, for applications at high frequency (beyond 15 MHz), having the lateral dimensions of the membranes to be reduced (as evident from the above equation (3)), the pitch $p_m$ must be scaled accordingly if an adequate filling factor has to be kept.

A limitation to the scaling of the dimension of the pitch in order to obtain wideband transducers at high frequencies is represented by the etching vias, which are needed to empty the cavities of the micro-membranes: the vias lateral size cannot be scaled like the membrane size and, therefore, the filling factor of the cMUT element reduces with very small membranes, and so does the acoustic coupling. Another technological limitation derives from problems of membrane collapse during the fabrication process (stiction), as well as from the needs for protection and mechanical robustness of the transducer, which impose a minimum thickness of the film (e.g. silicon nitride), hard to be less than 0.5 μm with the current technology. This dimension in turn sets a limit to the minimum diameter of the membranes, the minimum mechanical impedance, and the largest bandwidth that can be obtained. As a result, fractional bandwidths of 100% cannot be accomplished in a frequency range above 15 MHz with the technology currently available.

Aim of the present invention is the realization of cMUT transducers for high frequency applications overcoming, at least partially, the aforementioned drawbacks.

The invention achieves the aim with a transducer of the type described at the beginning, comprising a plurality of electrostatic micro-cells arranged in homogeneous groups (A,B,C, . . . ). The groups comprise one or more micro-cells having the same geometrical characteristics, whereas the micro-cells of each group have different geometries compared with the geometry of the micro-cells of the other group or groups. Thanks to the high acoustic coupling between the membranes and the fluid, by using micro-cells resonating at frequencies close to each other, bandwidths as wide as those that can be obtained for applications up to 15 MHz with cMUTs having micro-cells with identical geometrical characteristics can be achieved. The micro-cells geometry of each group is chosen so that the resonant frequency of the micro-cells in each group is different from the resonant frequency of the micro-cells of the other group or groups. In particular, the micro-cells have shape and size such as to resonate at frequencies above 15 MHz.

The micro-cells are preferably electrically connected or otherwise connectible in parallel. Given the physical parameters of the micro-cells in each group, such as, for example, the geometrical dimensions, for a given operating frequency of the transducer, the layout of the micro-cells of each group with reference to the micro-cells of the other group or groups is such that, when the micro-cells are excited, the average transmit pressure bandwidth of the transducer is larger than 80%, typically about 100%.

For a given operating frequency of the transducer, the micro-cells of at least a first group have advantageously shape and size such as to resonate at a frequency higher than the operating frequency, and the micro-cells of at least a second group have shape and size such as to resonate at a frequency lower than the operating frequency. Particularly, the micro-cells of the first group have dimensions smaller than the dimensions of the micro-cells of the second group. For example the diameter of the membrane of the micro-cells of the first group is smaller than the diameter of the membrane of the micro-cells of the second group. More generally, the dimensions of the micro-cells of the first group are smaller and the dimensions of the micro-cells of the second group are bigger than the dimensions of the micro-cells that would be required to realize a transducer with identical micro-cells, operating at the same centre frequency.

According to an advantageous embodiment, the micro-cells of each group have the same geometrical characteristics, i.e. the shape, of the micro-cells of the other group or groups, but they are scaled in dimensions.

The transducer according to the invention preferably comprises a silicon semiconductor substrate 11, on an upper surface of which a plurality of elastic membranes 9 are supported by a structural insulating layer 11 bound to the semiconductor substrate. A lower surface of the substrate and the membranes are metallized, each membrane/substrate pair defining an electrostatic micro-cell. However, any topology of cMUT transducer, carried out with any technology, can be used. The micro-cells can be made according to the above mentioned prior art but also, for example, according to the teachings of the European patent application published with the number EP1493499, or the PCT application published with the number WO02091796.

The transducer preferably comprises groups of micro-cells A, B differing from one another in membrane size. In particular, it comprises at least a first and at least a second group of micro-cells, being the dimensions of the membranes of the second group bigger than the dimensions of the membranes of the first group. The membranes are typically circular, but any other shape may be used, e.g. hexagonal, square and more in general polygonal, or combinations of these.

The transducer's micro-cells may be arranged in any orientation, but they are preferably placed side by side in a matrix layout. Typically, the matrix comprises one or more elementary sub-matrices $m_{ij}$ of M rows and N columns, made of micro-cells belonging to at least two distinct groups A and B, recurring in space with a prearranged frequency.

The following notation is used in the text, according to which the symbol $A_{ij}$ indicates that the position in the matrix $m_{ij}$ with row i and column j is occupied by a cell of the group A, whereas the symbol $B_{ij}$ indicates that the position in the matrix $m_{ij}$ with row i and column j is occupied by a cell of the group B.

According to an embodiment, the micro-cells of the first group A are arranged in a matrix of M rows and P columns, with P less than N ($A_{11}$, $A_{12}$, $A_{13}$, $A_{21}$, $A_{22}$, $A_{23}$, $A_{31}$, $A_{32}$, $A_{33}$, $A_{41}$, $A_{42}$, $A_{43}$), the remaining N−P columns being formed by micro-cells of the second group ($B_{14}$, $B_{24}$, $B_{34}$, $B_{44}$). The M×P matrix of micro-cells of the first group ($A_{12}$, $A_{13}$, $A_{22}$, $A_{23}$, $A_{32}$, $A_{33}$, $A_{42}$, $A_{43}$) is preferably included within the M×N matrix such as to be enclosed by columns of micro-cells of the second group ($B_{11}$, $B_{21}$, $B_{31}$, $B_{41}$, $B_{14}$, $B_{24}$, $B_{34}$, $B_{44}$). Alternatively, the micro-cells of the second group ($B_{11}$, $B_{12}$, $B_{13}$, $B_{21}$, $B_{22}$, $B_{23}$, $B_{31}$, $B_{32}$, $B_{33}$, $B_{41}$, $B_{42}$, $B_{43}$) may be arranged in a matrix of M rows and P columns, with P less than N, the remaining N−P columns being formed by micro-cells of the first group ($A_{14}$, $A_{24}$, $A_{34}$, $A_{44}$). The M×P matrix of micro-cells of the second group ($B_{12}$, $B_{13}$, $B_{22}$, $B_{23}$, $B_{32}$, $B_{33}$, $B_{42}$, $B_{43}$) may be, for example, placed within the M×N matrix such as to be enclosed by columns of micro-cells of the first group ($A_{11}$, $A_{21}$, $A_{31}$, $A_{41}$, $A_{14}$, $A_{24}$, $A_{34}$, $A_{44}$).

According to another embodiment, the rows of the M×N matrix are occupied by micro-cells of the first and the second group alternately ($A_{11}$, $B_{12}$, $A_{13}$, $B_{14}$, $B_{21}$, $A_{22}$, $B_{23}$, $A_{24}$, $A_{31}$, $B_{32}$, $A_{33}$, $B_{34}$, $B_{41}$, $A_{42}$, $B_{43}$, $A_{44}$), particularly the columns of the M×N matrix are formed by micro-cells of the first and the second group alternately ($A_{11}$, $A_{12}$, $A_{13}$, $A_{14}$, $B_{21}$, $B_{22}$, $B_{23}$, $B_{24}$, $A_{31}$, $A_{32}$, $A_{33}$, $A_{34}$, $B_{41}$, $B_{42}$, $B_{43}$, $B_{44}$); or the columns of the M×N matrix are alternatively occupied by micro-cells of the first and the second group ($A_{11}$, $B_{12}$, $A_{13}$, $B_{14}$, $A_{21}$, $B_{22}$, $A_{23}$, $B_{24}$, $A_{31}$, $B_{32}$, $A_{33}$, $B_{34}$, $A_{41}$, $B_{42}$, $A_{43}$, $B_{44}$). The elements of adjacent columns may be offset such as to include in each row micro-cells alternatively of the first and the second group ($A_{11}$, $B_{12}$, $A_{13}$, $B_{14}$, $B_{21}$, $A_{22}$, $B_{23}$, $A_{24}$, $A_{31}$, $B_{32}$, $A_{33}$, $B_{34}$, $B_{41}$, $A_{42}$, $B_{43}$, $A_{44}$) or the elements of adjacent columns are partly offset such as to form at least a sub-matrix ($m_{12}$, $m_{13}$, $m_{22}$, $m_{23}$, $m_{32}$, $m_{33}$, $m_{42}$, $m_{43}$) including in each row micro-cells of the same group ($A_{12}$, $A_{13}$, $B_{22}$, $B_{23}$, $A_{32}$, $A_{33}$, $B_{42}$, $B_{43}$). This sub-matrix may be externally surrounded by micro-cells of the first and the second group, each micro-cell of a group located on the outer side of the sub-matrix being next to a micro-cell of the other group ($B_{11}$, $A_{21}$, $B_{31}$, $A_{41}$, $B_{14}$, $A_{24}$, $B_{34}$, $A_{44}$).

The frequency response of the multi-resonant element according to the invention may be further optimised and equalized through an appropriate electrode sizing, according to the size of the corresponding membranes to which they are connected. To this purpose, the micro-cells of each group have preferably electrodes of a different size as compared with the size of the electrodes of the micro-cells of the other group or groups. In particular, the micro-cells with a greater size have a greater electrode diameter than the micro-cells with a smaller size.

According to another aspect, the invention refers to an electronic array probe comprising an ordered set of electro-acoustic transducers having micro-cells with different physical characteristics, such as, for example, the geometrical dimensions.

Further characteristics and improvements are object of the sub-claims.

The present invention will be now described, by way of illustration and not by way of limitation, according to its preferred embodiments, by particularly referring to the figures of the enclosed drawings.

BRIEF SUMMARY OF THE INVENTION

An electro-acoustic transducer according to one embodiment of the present invention comprises a plurality of electrostatic micro-cells, characterised in that the micro-cells are arranged in homogeneous groups (A, B, C) of micro-cells having the same geometrical characteristics, each group comprising micro-cells having geometries different from the geometry of the micro-cells of the other group or groups.

One object of the present invention is to provide an improved electro-acoustic transducer.

Related objects and advantages of the present invention will be apparent from the following description.

BRIEF DESCRIPTION OF THE SEVERAL VIEWS OF THE DRAWINGS

FIGS. 4*a* and 4*b* show a prior art cMUT transducer.

FIG. 5 shows a fabrication process of the cMUT transducer of FIGS. 4*a* and 4*b*.

DETAILED DESCRIPTION OF THE INVENTION

Figure 1:
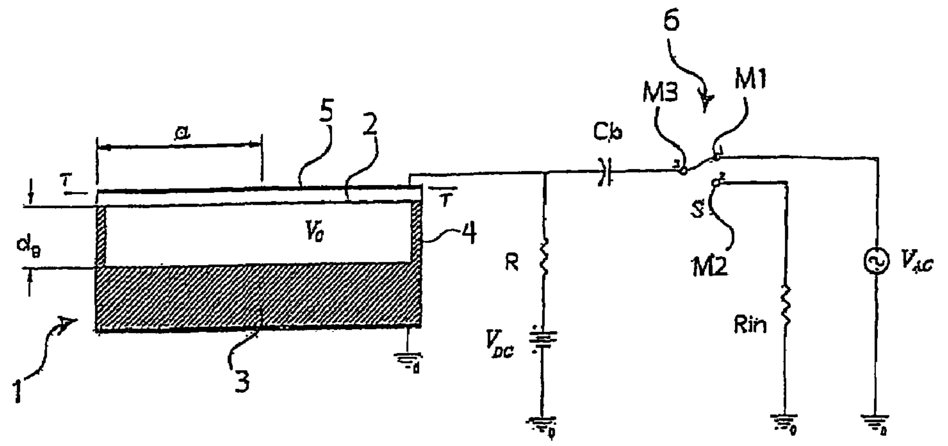
FIG. 1 shows a first prior art electrostatic transducer.
Figure 2:
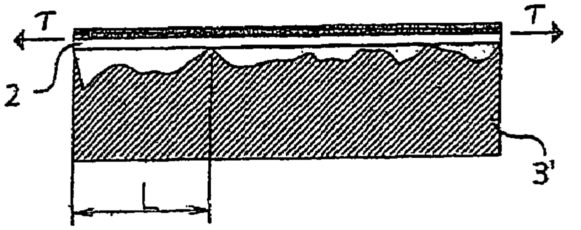
FIG. 2 shows a second prior art electrostatic transducer.
Figure 3A:
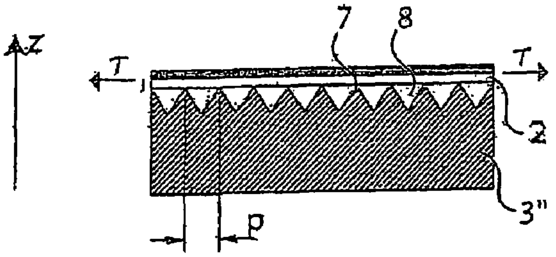
FIGS. 3*a* and 3*b* show a third prior art electrostatic transducer.
Figure 3B:
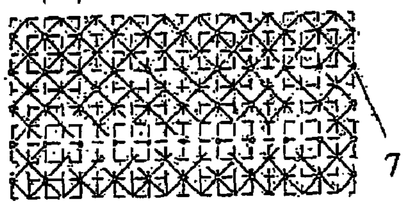
Figure 6:
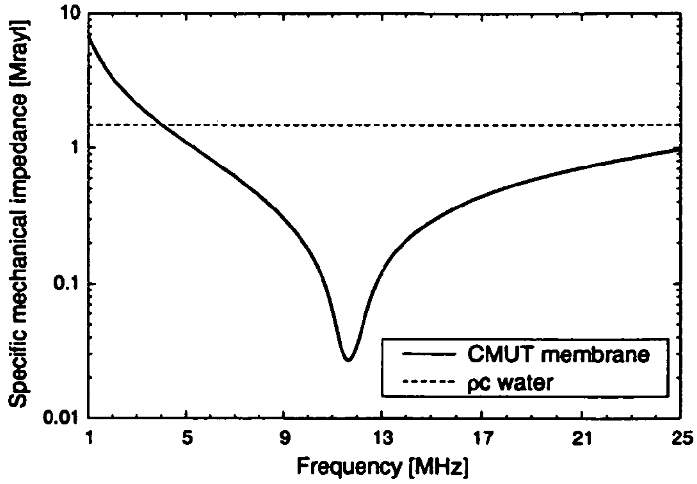
FIG. 6 shows the specific mechanical impedance of a cMUT membrane resonating at 12 MHz (solid line), and the specific acoustic impedance of water (dashed line).
Figure 7B:
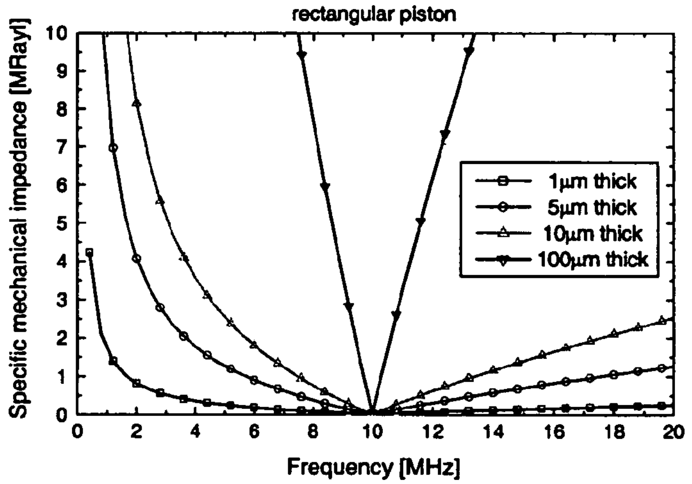
FIG. 7*b* shows several mechanical impedance curves of the FIG. 7*a* piston.
Figure 7A:
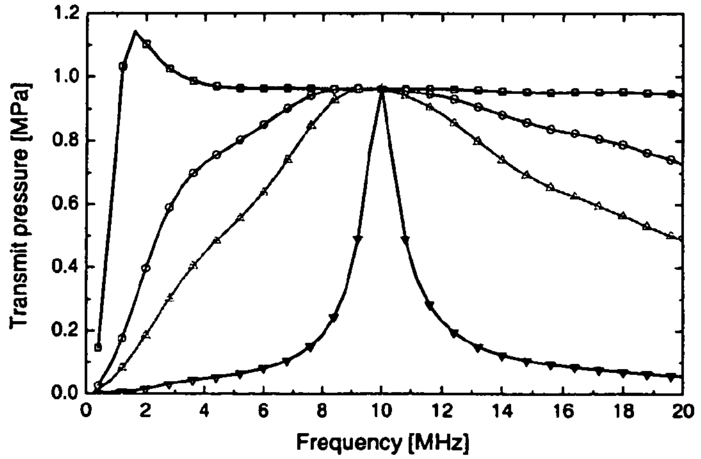
FIG. 7*a* shows the average pressure transmitted in water by a rectangular piston transducer.
Figure 8:
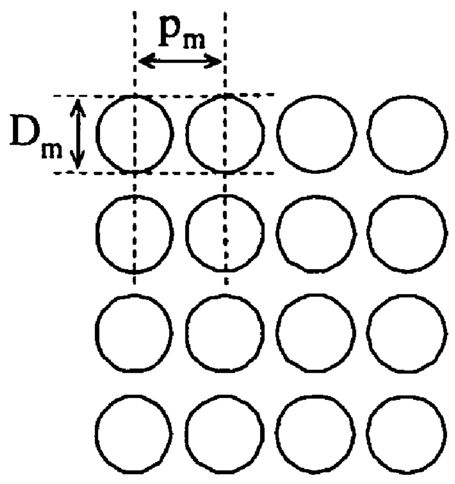
FIG. 8 shows a representative matrix arrangement of circular membranes within a cMUT element.
Figure 9:
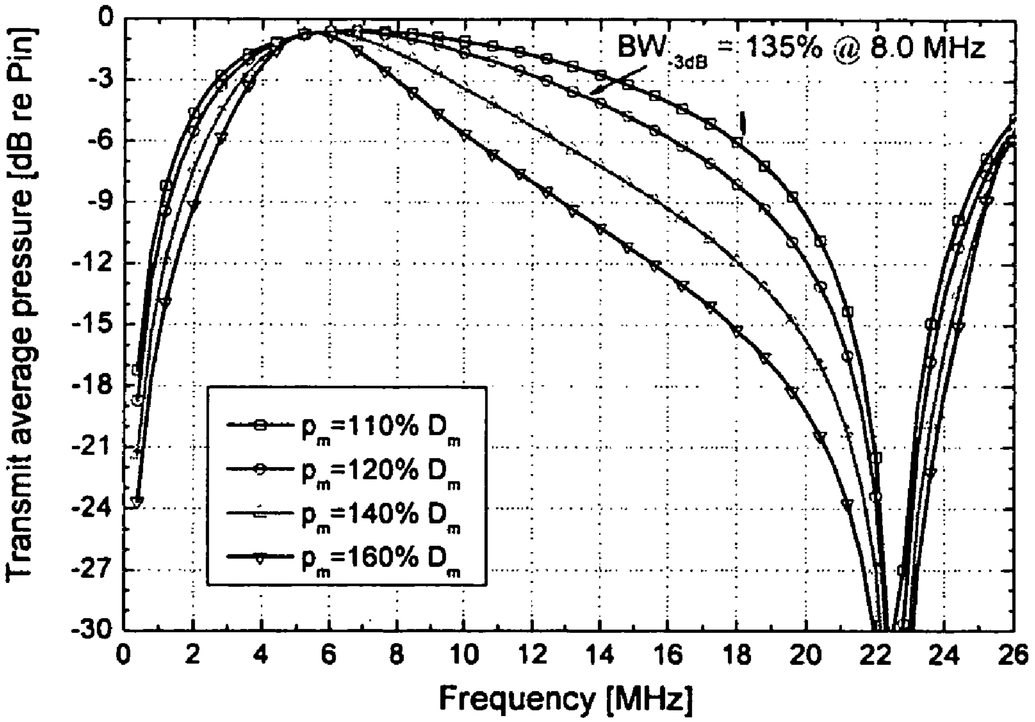
FIG. 9 shows the average pressure transmitted by a cMUT element in water for increasing values of the pitch $p_m$ between membranes of diameter $D_m$.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 10:
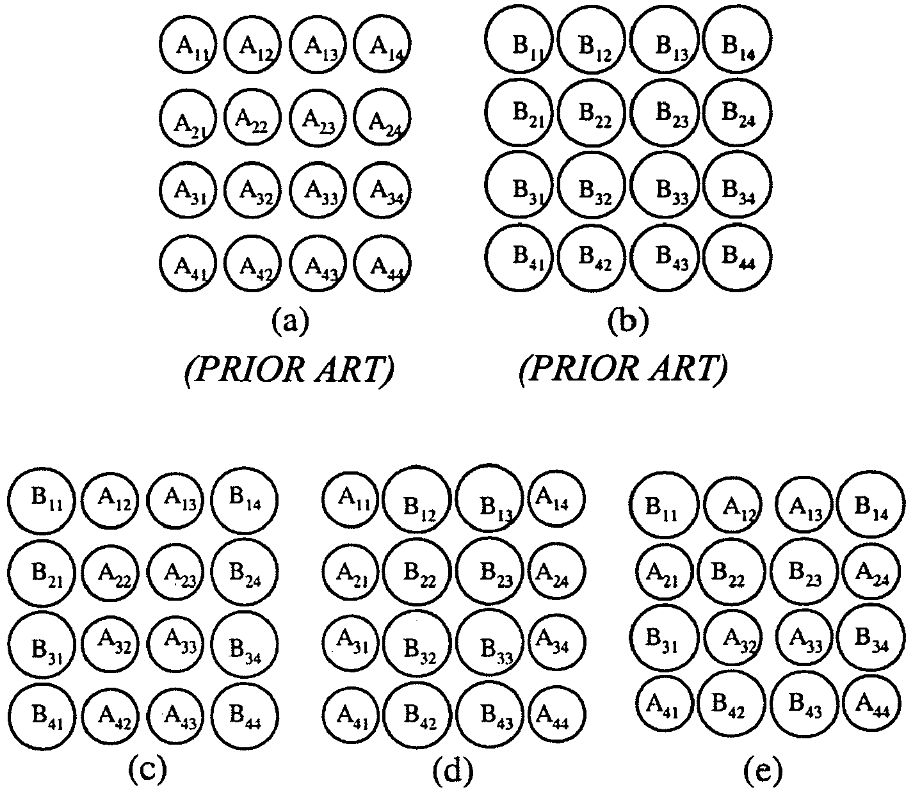
FIGS. 10*a*-10*e* depict various cMUT array configurations with circular membranes arranged in a matrix fashion, according to the prior art (10*a*, 10*b*) and according to the present invention (10*c*, 10*d*, and 10*e*).

With reference to FIG. 10(*c, d, e*), the transducer according to the invention schematically consists of circular micro-cells $m_{ij}$ in a matrix arrangement with 4 columns and an undefined number M of rows (4 in the figure for simplicity of the drawing), with M>>4. In comparison with the prior art transducer schematically depicted in FIG. 10(*a, b*) having uniform membranes configurations, the micro-cells according to the invention do not have the same dimensions, but they are divided into two groups. The micro-cells of the second group B have membranes whose diameter is larger than the diameter of the membranes of the first group A and are intermixed the ones with the others as in the example of FIG. 10(*c, d, e*). In particular, referring to FIG. 10*c*, the micro-cells with smaller diameter are laid along two inner adjacent columns ($A_{12}$, $A_{13}$, $A_{22}$, $A_{23}$, $A_{32}$, $A_{33}$, and so on). The micro-cells with larger diameter are laid along the two outermost columns, each placed at the sides of the columns of micro-cells with smaller diameter ($B_{11}$, $B_{21}$, $B_{31}$, $B_{41}$, $B_{14}$, $B_{24}$, $B_{34}$, $B_{44}$, and so on). Referring to FIG. 10*d*, the situation is inverted and the two columns of membranes having smaller diameter ($A_{11}$, $A_{21}$, $A_{31}$, $A_{41}$, $A_{14}$, $A_{24}$, $A_{34}$, $A_{44}$, and so on) are laid along the sides of the two adjacent columns of membranes having bigger diameters ($B_{12}$, $B_{13}$, $B_{22}$, $B_{23}$, $B_{32}$, $B_{33}$, $B_{42}$, $B_{43}$, and so on). The arrangement of FIG. 10*e* is a middle course with respect to the previous ones: each column includes micro-cells of the two groups, spaced out with a unit repetition frequency from one another. Two columns are placed centrally side-by-side and have the same sequence of membranes starting from the smallest ($A_{12}$, $B_{22}$, $A_{32}$, $B_{42}$, $A_{13}$, $B_{23}$, $A_{33}$, $B_{43}$), while the remaining two columns have sequence of membranes inverted starting from the biggest and are placed on the sides of the first two columns ($B_{11}$, $A_{21}$, $B_{31}$, $A_{41}$, $B_{14}$, $A_{24}$, $A_{34}$, $B_{44}$).

All the plots described hereinafter were obtained through finite element modeling (FEM) simulations using the commercial software ANSYS, assuming that the cMUT transducer has a finite width (4 columns in the specific of FIG. 10) and an infinite length for computational simplicity.

Figure 11:
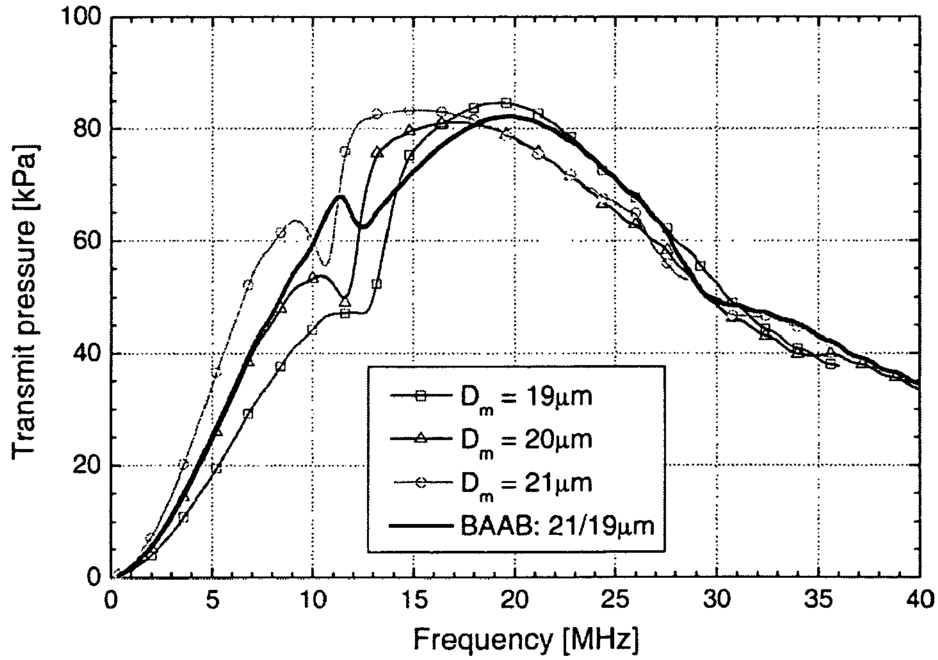
FIG. 11 shows a comparison between the average transmit pressure of a cMUT element with the uniform-membranes arrangement of FIG. 10*a*, and the mixed arrangement of FIG. 10*c*.
Figure 12:
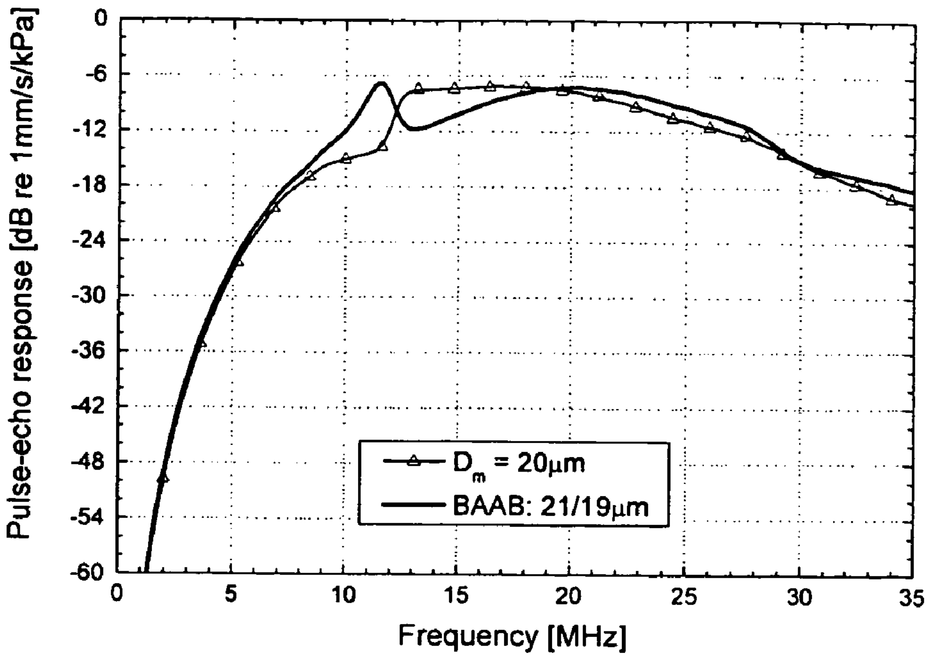
FIG. 12 shows the pulse-echo response with short-circuit receive of a cMUT element with uniform membranes arranged as in FIG. 10*a*, as compared with the mixed arrangement of FIG. 10*c*.

FIG. 11 shows a comparison between the pressure transmitted by the traditional configuration of FIG. 10*a*, and the two-distinct-membranes arrangement of FIG. 10*c*, for a cMUT array element designed to operate at 20 MHz. All the configurations have the same pitch, $p_m$=24 μm. Note how the global response of the element having mixed membranes with diameters $D_A$=19 μm and $D_B$=21 μm is very close to that of the uniform element having membranes with intermediate diameter ($D_m$=20 μm), both at low frequencies (below approximately 10 MHz) and at high frequencies (above 35 MHz); at intermediate frequencies, the differentiation of the two diameters favours, through the coupling with the fluid, a transmitted pressure level "equalization", thus improving the uniformity in the bandwidth of the frequency response around 20 MHz. The pulse-echo response of the same element with short-circuit receive is shown in FIG. 12. As can be seen, the −6-dB fractional bandwidth is 100% around the central frequency 19 MHz for the multi-membranes configuration, whereas it is only 85% for the traditional all-equal membranes configuration.

Figure 13:
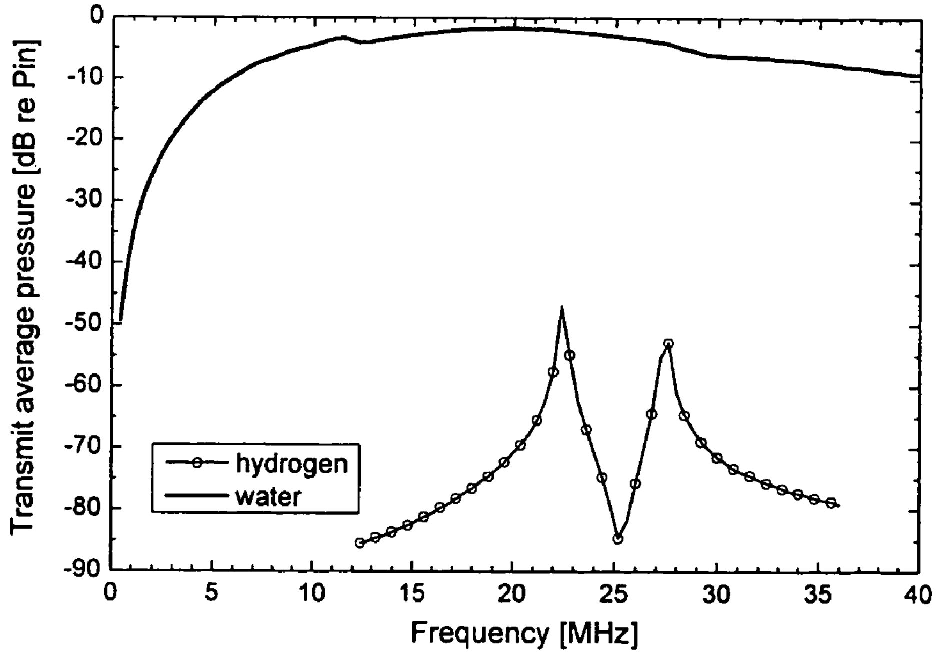
FIG. 13 shows the average pressure transmitted by the double-resonance transducer in the arrangement of FIG. 10*c*, in both gas and liquid coupling.

Given the number of micro-cells and their geometrical characteristics of a transducer element, particularly the number of micro-cells having, for example, different membrane diameter or the number of groups of homogeneous micro-cells within the same transducer and thus the number of distinct resonance frequencies, one can determine the arrangement for obtaining the optimum bandwidth for each configuration by means of simulations and routine experiments. All that thanks to the low mechanical impedance of the membranes and the high acoustic matching existing between the coupling fluid and the membranes. It is, in fact, this peculiar characteristic of cMUT devices that allows to achieve as an effect the bandwidth broadening by combining elements resonating at different, but close frequencies. This is particularly evident in the example of FIG. 13, where the average pressure transmitted by the multi-resonance cMUT element having the configuration of FIG. 10*c*, with membrane diameters of $D_A$=19 μm and $D_B$=21 μm, in a gas (hydrogen) and in a liquid (water) is compared. Because of the high acoustic impedance mismatch due to the coupling with the gas, the resonance frequencies of the two groups of membranes do not interfere constructively and the frequency response exhibits two distinct peaks (bottom diagram), differently to what is obtained in case of coupling with water wherein the peaks are absent and the bandwidth has a high uniformity and amplitude (upper diagram).

The micro-cells of cMUT transducers are suitable to be diversified in their geometry so as to resonate at different frequencies within the same transducer. The easiest way to do that is to act on the dimensions of the membranes, as in the examples described above. However, analogous results can be obtained by acting on the thickness of the membranes and of the holes or on the lateral dimensions of the micro-cells. All that thanks to the surface micromachining process of fabrication and the use of photolithographic masks. For example the differentiation of the micro-cells based on different thickness can be accomplished through subsequent selective layers depositions by means of photolithographic masks. In spite of an increased number of fabrication steps, in this way the membranes would be more closely packed, for the benefit of the gain-bandwidth product. In principle, the mechanical properties of the layers might also be diversified among the micro-cells to get different resonances.

The frequency response of the multi-resonant element according to the invention can be further optimized and equalized by appropriately sizing the electrodes according to the size of the membranes to which they are connected.

By suitably optimising the radius of the electrode, the emission of each membrane can be differently "weighted" so as to equalize the frequency response. For example, a higher metallization fraction of the bigger membranes as compared to the smaller membranes favours the emission of the bigger membranes, i.e. the transmission in the low-frequency region of the pulse-echo spectrum. However, the collapse voltages of the mixed-size membranes should remain as close as possible. In fact, as a rough estimate, the collapse voltage of a circularly-shaped membrane is inversely proportional to its radius and to that of the electrode (A. Caronti, R. Carotenuto, G. Caliano, and M. Pappalardo, "The effects of membrane metallization in capacitive microfabricated ultrasonic transducers," *J. Acoust. Soc. Am.*, Vol. 115, no. 2, pp. 651-657, 2004). Since the bias voltage, in the simpler version of the multi-resonant transducer, is the same for all the membranes (connected in parallel), a good uniformity of the collapse voltages is needed for a good efficiency to be achieved. In other words, it is possible to promote a bandwidth improvement against a reduction in efficiency, whereas the gain-bandwidth product remains substantially unaltered.

Figure 14:
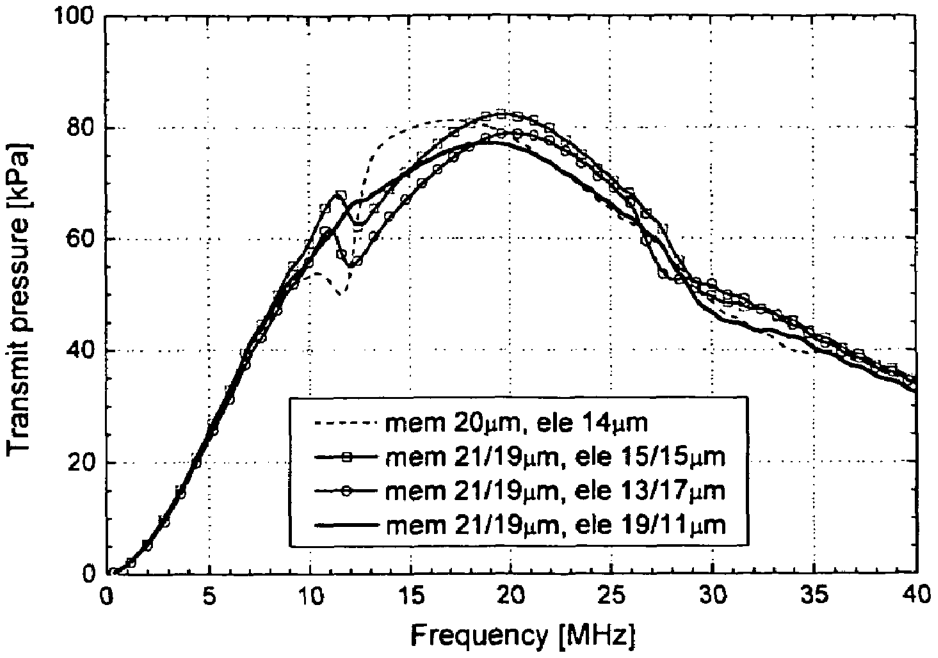
FIG. 14 shows the average pressure transmitted by a cMUT element with the mixed-membranes arrangement of FIG. 10*c*, for different combinations of the electrode diameters, as compared with the uniform-membranes arrangement of FIG. 10*a* (dashed line).

An example of application of this technique to the mixed arrangement of FIG. 10*c* is shown in FIG. 14. As can be noted, in the case of membranes with two different diameters (21 and 19 μm), a proper electrode sizing (19 μm and 11 μm) can lead to disappearance of the two peaks in the frequency response with a high uniformity in the bandwidth (thick solid line). This result is obtained at the expense of a small reduction in the average transmitted pressure level.

Figure 15:
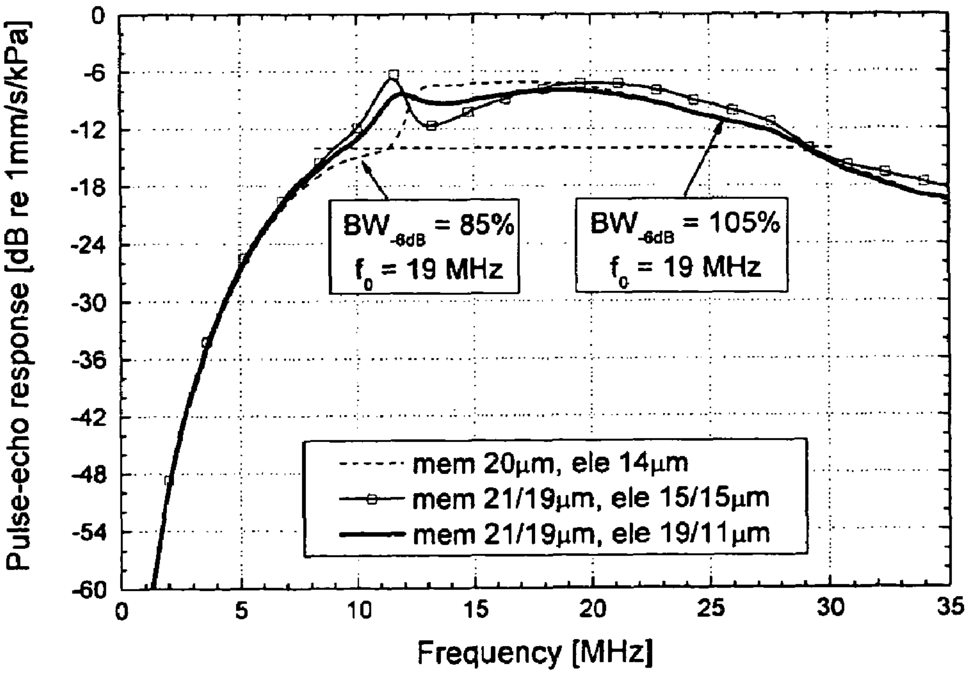
FIG. 15 shows the pulse-echo response with short-circuit receive of the cMUT element with the mixed-membranes arrangement of FIG. 10*c* and electrode optimisation, as compared with the uniform-membranes arrangement (dashed line).

A comparison of the pulse-echo response with short-circuit receive of the same element with electrode size optimisation is shown in FIG. 15. The electrode-optimised configuration (19 and 11 μm) exhibits a −6 dB fractional bandwidth of 105%, with a 25% improvement compared to the traditional uniform layout (dashed line).

Figure 16:
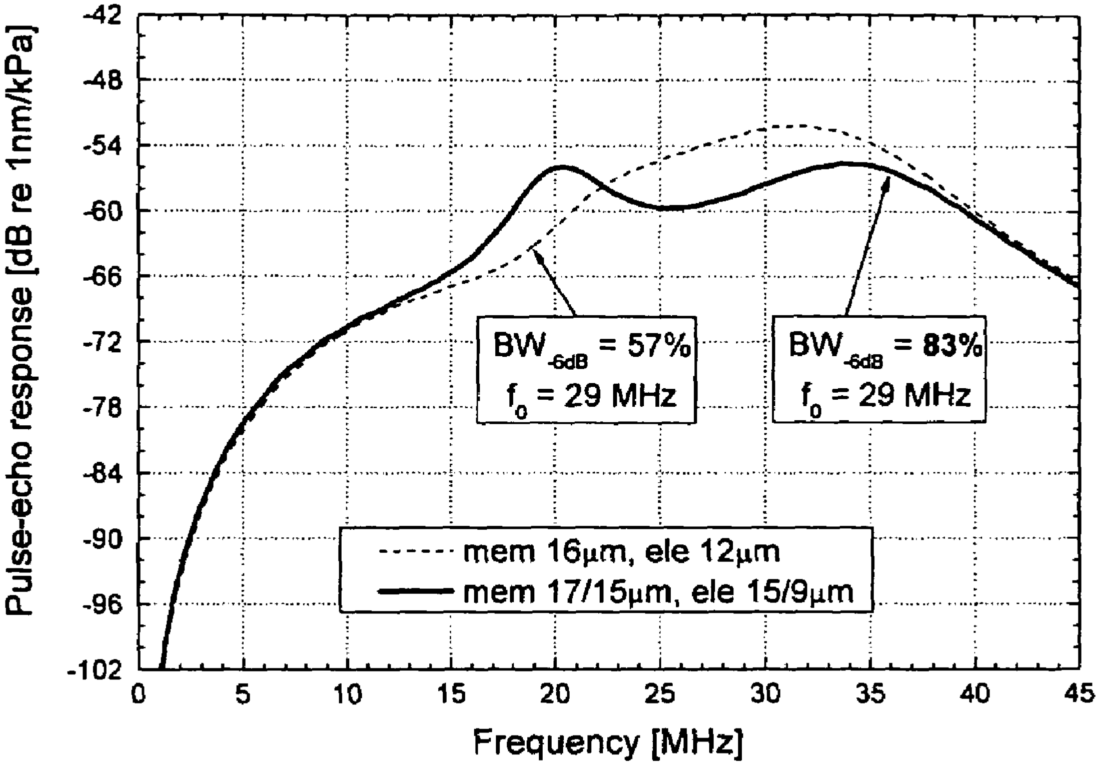
FIG. 16 shows the pulse-echo response with open-circuit receive of a 30-MHz cMUT array element with the uniform-membranes arrangement of FIG. 10*a* (dashed line), as compared with the mixed-membranes arrangement of FIG. 10*c* with electrode optimisation (solid line).

Another example regarding a cMUT array element designed for 30-MHz operation is shown in FIG. 16, where the mean membrane diameter is 16 μm and the pitch $p_m$ is 20 μm. In this case, with a two-membranes layout with 17 μm and 15 μm diameters, and electrode sizes of 15 μm and 9 μm respectively, the fractional bandwidth increases by 45% compared to the traditional 16 μm diameter layout with 9 μm electrode diameter.

The above examples refer to the exemplary case of micro-cells belonging to only two groups (A and B) having different membrane diameters. However the larger the number of resonance frequencies, and thus of the groups of micro-cells having different characteristics (A, B, C, D, E, . . . ), the stronger the bandwidth improvement that can be achieved as compared to a traditional all-equal-membranes layout.

Although this technique is particularly indicated for high frequency applications (that is for frequencies above 15 MHz) where an increase of the fractional bandwidth is especially advisable, also the applications at lower frequencies can benefit from the teachings of the present invention to realize transducers with very large and particularly optimized bandwidths.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An electro-acoustic transducer comprising a plurality of electrostatic micro-cells, characterised in that said micro-cells are arranged in homogeneous groups (A, B, C) of micro-cells having the same geometrical characteristics, each group comprising micro-cells having geometries different from the geometry of the micro-cells of the other group or groups such that the micro-cells of one group (A) have a resonance frequency different from the resonance frequency of the micro-cells of the other group or groups (B, C), the micro-cells of the groups (A, B, C) are constructed and arranged with shapes and dimensions so as to resonate and constructively interfere at frequencies above 15 MHz, wherein the electro-acoustic transducer is constructed and arranged to be acoustically coupled with a liquid and the layout of the micro-cells of each group (A) with respect to the micro-cells of the other group or groups (B, C) is such that, when the micro-cells are excited, the average pressure transmitted by the transducer has a bandwidth larger than 80%.

2. A transducer according to claim 1, characterised in that the micro-cells of the groups (A, B, C) are electrically connected or connectible in parallel.

3. A transducer according to claim 1, characterised in that, for a given operating frequency of the transducer, the micro-cells of at least a first group (A) have shape and size such as to resonate at a frequency higher than the operating frequency and the micro-cells of at least a second group (B) have shape and size such as to resonate at a frequency lower than the operating frequency.

4. A transducer according to claim 3, characterised in that the micro-cells of the first group (A) have smaller size than the micro-cells of the second group (B).

5. A transducer according to claim 3, characterised in that the micro-cells of the first group (A) has size smaller and the micro-cells of the second group (B) has size bigger than the size of the micro-cells that would be required to make a transducer with all-equal micro-cells and operating at the same centre frequency.

6. A transducer according to claim 1, characterised in that the micro-cells of each group (A) have the same geometrical characteristics as the micro-cells of the other group or groups (B, C), but scaled dimensions.

7. A transducer according to claim 1, characterized in comprising a silicon substrate (11), on an upper surface of which a plurality of elastic membranes (9) are supported by a structural insulating layer (11) bound to the semiconductor substrate, a lower surface of the substrate and said membranes being metallized, each membrane-substrate pair defining an electrostatic micro-cell.

8. A transducer according to claim 7, characterised in comprising groups of micro-cells differing in the size of the membranes (9).

9. A transducer according to claim 8, characterised in comprising at least a first and at least a second group of micro-cells (A,B), the membranes (9) of the micro-cells of the second group (B) having size bigger than the size of the membranes of the first group (A).

10. A transducer according to claim 7, characterized in comprising circularly-shaped membranes (9).

11. A transducer according to claim 1, characterized in comprising micro-cells placed side by side in a matrix layout.

12. A transducer according to claim 11, characterised in comprising one or more elementary matrices ($m_{ij}$) of M rows and N columns formed by micro-cells belonging to a first (A) and a second group (B).

13. A transducer according to claim 12, characterised in that the micro-cells of the first group (A) are arranged in a matrix of M rows and P columns, with P less than N ($A_{11}$, $A_{12}$, $A_{13}$, $A_{21}$, $A_{22}$, $A_{23}$, $A_{31}$, $A_{32}$, $A_{33}$, $A_{41}$, $A_{42}$, $A_{43}$), the remaining N−P columns being formed by micro-cells of the second group ($B_{14}$, $B_{24}$, $B_{34}$, $B_{44}$).

14. A transducer according to claim 13, characterised in that the M×P matrix of micro-cells of the first group ($A_{12}$, $A_{13}$, $A_{22}$, $A_{23}$, $A_{32}$, $A_{33}$, $A_{42}$, $A_{43}$) is included in the M×N matrix such as to be enclosed by columns of micro-cells of the second group ($B_{11}$, $B_{21}$, $B_{31}$, $B_{41}$, $B_{14}$, $B_{24}$, $B_{34}$, $B_{44}$).

15. A transducer according to claim 12, characterised in that the micro-cells of the second group ($B_{11}$, $B_{12}$, $B_{13}$, $B_{21}$, $B_{22}$, $B_{23}$, $B_{31}$, $B_{32}$, $B_{33}$, $B_{41}$, $B_{42}$, $B_{43}$) are arranged in a matrix layout of M rows and P columns, with P less than N, the remaining N−P columns being formed by micro-cells of the first group ($A_{14}$, $A_{24}$, $A_{34}$, $A_{44}$).

16. A transducer according to claim 15, characterised in that the M×P matrix of micro-cells of the second group ($B_{12}$, $B_{13}$, $B_{22}$, $B_{23}$, $B_{32}$, $B_{33}$, $B_{42}$, $B_{43}$) is included in the M×N matrix such as to be enclosed by columns of micro-cells of the first group ($A_{11}$, $A_{21}$, $A_{31}$, $A_{41}$, $A_{14}$, $A_{24}$, $A_{34}$, $A_{44}$).

17. A transducer according to claim 12, characterised in that the rows of the M×N matrix are occupied by micro-cells of the first and the second group alternately ($A_{11}$, $B_{12}$, $A_{13}$, $B_{14}$, $B_{21}$, $A_{22}$, $B_{23}$, $A_{24}$, $A_{31}$, $B_{32}$, $A_{33}$, $B_{34}$, $B_{41}$, $A_{42}$, $B_{43}$, $A_{44}$).

18. A transducer according to claim 12, characterised in that the columns of the M×N matrix are occupied by micro-cells of the first and the second group alternately ($A_{11}$, $A_{12}$, $A_{13}$, $A_{14}$, $B_{21}$, $B_{22}$, $B_{23}$, $B_{24}$, $A_{31}$, $A_{32}$, $A_{33}$, $A_{34}$, $B_{41}$, $B_{42}$, $B_{43}$, $B_{44}$).

19. A transducer according to claim 12, characterised in that the positions of the columns of the M×N matrix are alternatively occupied by micro-cells of the first and the second group ($A_{11}$, $B_{12}$, $A_{13}$, $B_{14}$, $A_{21}$, $B_{22}$, $A_{23}$, $B_{24}$, $A_{31}$, $B_{32}$, $A_{33}$, $B_{34}$, $A_{41}$, $B_{42}$, $A_{43}$, $B_{44}$).

20. A transducer according to claim 19, characterised in that the micro-cells of adjacent columns are offset such as to include in each row micro-cells alternatively of the first and the second group ($A_{11}$, $B_{12}$, $A_{13}$, $B_{14}$, $B_{21}$, $A_{22}$, $B_{23}$, $A_{24}$, $A_{31}$, $B_{32}$, $A_{33}$, $B_{34}$, $B_{41}$, $A_{42}$, $B_{43}$, $A_{44}$).

21. A transducer according to claim 19, characterised in that the micro-cells of adjacent columns are partly offset such as to form at least a sub-matrix ($m_{12}$, $m_{13}$, $m_{22}$, $m_{23}$, $m_{32}$, $m_{33}$, $m_{42}$, $m_{43}$) including in each row micro-cells of the same group ($A_{12}$, $A_{13}$, $B_{22}$, $B_{23}$, $A_{32}$, $A_{33}$, $B_{42}$, $B_{43}$).

22. A transducer according to claim 21, characterised in that the sub-matrix ($m_{12}$, $m_{13}$, $m_{22}$, $m_{23}$, $m_{32}$, $m_{33}$, $m_{42}$, $m_{43}$) is externally surrounded by micro-cells of the first and the second group, each micro-cell of a group which is located on the outer side of the sub-matrix being next to a micro-cell of the other group ($B_{11}$, $A_{21}$, $B_{31}$, $A_{41}$, $B_{14}$, $A_{24}$, $B_{34}$, $A_{44}$).

23. A transducer according to claim 1, characterized in that the elementary matrices of micro-cells belonging to more homogeneous groups (A, B, C) are spatially arranged so as to recur in space with a prearranged frequency.

24. A transducer according to claim 1, characterized in that the micro-cells of each group (A) have electrodes with different size compared with the electrodes of the micro-cells of the other group or groups (B).

25. A transducer according to claim 24, characterised in that the electrodes of the micro-cells with larger dimensions (B) have a diameter bigger than the diameter of the electrodes of the micro-cells with smaller dimensions (A).

26. A transducer according to claim 24, characterized in comprising two groups of micro-cells, the membranes (9) of the micro-cells of the first group (A) having a diameter of about 19 μm and the membranes of the micro-cells of the second group (B) having a diameter of about 21 μm for operating frequencies of about 20 MHz.

27. A transducer according to claim 24, characterised in that the electrode diameter of the micro-cells of the first group (A) is about 11 μm and the electrode diameter of the micro-cells of the second group (B) is about 19 μm.

28. A transducer according to claim 24, characterized in comprising two groups of micro-cells, the membranes (9) of the micro-cells of the first group (A) having a diameter of about 15 μm, and the membranes of the micro-cells of the second group (B) having a diameter of about 17 μm for operating frequencies of about 30 MHz.

29. A transducer according to claim 24, characterised in that the electrode diameter of the membranes of the first group (A) is about 9 μm, and the electrode diameter of the membranes of the second group (B) is about 15 μm.

30. An electronic array probe comprising an ordered set of electro-acoustic transducers according to claim 1.

31. An electro-acoustic transducer comprising a plurality of electrostatic micro-cells, characterised in that said micro-cells are arranged in homogeneous groups of micro-cells having the same geometrical characteristics, each group comprising micro-cells having geometries different from the geometry of the micro-cells of the other group or groups such that the micro-cells of one group have a resonance frequency different from the resonance frequency of the micro-cells of the other group or groups, one of said groups of micro-cells is constructed and arranged with a shape and dimension so as to resonate at frequencies above 15 MHz, wherein the electro-acoustic transducer is constructed and arranged to be acoustically coupled with a liquid and the layout of the micro-cells of each group with respect to the micro-cells of the other group or groups is such that, when the micro-cells are excited, the average pressure transmitted by the transducer has a bandwidth larger than 80%.

* * * * *